(12) United States Patent
Antoun

(10) Patent No.: US 9,089,802 B2
(45) Date of Patent: Jul. 28, 2015

(54) COLLECTION SYSTEM FOR LIQUID SUSPENDED IN A GAS

(71) Applicant: Gregory S. Antoun, Meadville, PA (US)

(72) Inventor: Gregory S. Antoun, Meadville, PA (US)

( * ) Notice: Subject to any disclaimer, the term of this patent is extended or adjusted under 35 U.S.C. 154(b) by 216 days.

(21) Appl. No.: 13/713,732

(22) Filed: Dec. 13, 2012

(65) Prior Publication Data

US 2014/0165832 A1    Jun. 19, 2014

(51) Int. Cl.
  *B01D 45/04* (2006.01)
  *B01D 50/00* (2006.01)
  *B01D 45/14* (2006.01)
  *B01D 45/08* (2006.01)

(52) U.S. Cl.
  CPC ............ *B01D 45/04* (2013.01); *B01D 45/08* (2013.01); *B01D 45/14* (2013.01); *B01D 50/002* (2013.01); *B01D 2277/20* (2013.01)

(58) Field of Classification Search
  CPC ........ B01D 45/08; B01D 45/12; B01D 45/14; B01D 50/00; B01D 50/002; B01D 2277/20; B01D 45/04; B01D 45/06; B01D 45/16
  USPC .......... 55/318, 320, 321, 322, 323, 337, 394, 55/396, 397, 437, 438, 441, 482, 485, 55/486; 95/261, 269, 270
  See application file for complete search history.

(56) References Cited

U.S. PATENT DOCUMENTS

| | | | | |
|---|---|---|---|---|
| 4,811,566 A | * | 3/1989 | Silvestri et al. | 60/646 |
| 6,833,022 B2 | * | 12/2004 | Feisthammel et al. | 95/91 |
| 2011/0247308 A1 | * | 10/2011 | Davis et al. | 55/392 |

OTHER PUBLICATIONS

What you Need to Know About Occupational Exposure to Metalworking Fluids, National Institute for Occupational Safety & Health, NIOSHP Publication 98-116 (Mar. 1998).

* cited by examiner

*Primary Examiner* — Robert Clemente
(74) *Attorney, Agent, or Firm* — Bartony & Associates, LLC

(57) ABSTRACT

A system includes a processing system in which a liquid is used in processing such that at least a portion of the liquid becomes suspended in a gas and a liquid collection system in fluid connection with the processing system to decrease the amount of liquid in the suspension of the liquid in the gas. The liquid collection system includes a centrifugal pump (or blower) including a housing and a rotatable impeller within the housing. The housing also includes an inlet port and an outlet port in fluid connection therewith. The liquid collection system further includes a liquid collection device in fluid connection with the outlet port. The liquid collection device includes a gas outlet channel in fluid connection with the outlet port and a liquid outlet port spaced from the gas outlet channel and adjacent an inner surface of the housing of the centrifugal pump. The system may further include a container in fluid connection with the liquid outlet port to contain liquid (separated from the gas). In a number of embodiments, the liquid collection system includes a system housing at least partially enclosing the centrifugal pump and the liquid collection device. The system may, for example, be configured so that the liquid outlet port is positioned below the gas outlet channel. In a number of embodiments, the liquid is a coolant liquid.

22 Claims, 6 Drawing Sheets

Table 1

| | test description | test time in min. | air velocity m/min | open area of device inlet | air flow (m3) | oil atomized in grams | oil atomized in ml | oil that escaped the device | % escaped | ml per m3 in outflow of the device | |
|---|---|---|---|---|---|---|---|---|---|---|---|
| 1 | oil was fed into device inlet using only the suction of the device, no paint gun. 4 filters in alternating sequence, 1 baffle/1 mesh, 1 baffle/1 mesh | 1 | 1172.6 | 0.01824 | 21.38822 | 2000 | 2398.1 | 1 | 0.04% | 0.0468 | no oil was detected | 1 gram was scale accuracy |
| 2 | 4 filters in alternating sequence, 1 mesh/1baffle, 1 mesh/ 1 baffle | 7.25 | 1172.6 | 0.01824 | 155.06462 | 736 | 882.5 | 8 | 0.91% | 0.0516 | | |
| 3 | 4 filters all baffles | 7.81 | 1172.6 | 0.01824 | 167.04203 | 726 | 870.5 | 12 | 1.38% | 0.0718 | | |
| 4 | 4 filters all mesh | 7.71 | 1172.6 | 0.01824 | 164.90321 | 754 | 904.1 | 7 | 0.77% | 0.0424 | | |
| 5 | 4 filters in alternating sequence,1 baffel/1 mesh/, 1baffle/1 mesh | 7.86 | 1172.6 | 0.01824 | 168.11144 | 752 | 901.7 | 5 | 0.55% | 0.0297 | | |

Fig. 6

COLLECTION SYSTEM FOR LIQUID SUSPENDED IN A GAS

BACKGROUND

The following information is provided to assist the reader in understanding certain technology disclosed below and the environment in which it will typically be used. The terms used herein are not intended to be limited to any particular narrow interpretation unless clearly stated otherwise in this document. References set forth herein may facilitate understanding of the technologies or the background thereof. The disclosures of all references cited herein are incorporated by reference.

In many industrial and other processes, various liquids can become entrained in air and present a breathing hazard. For example, in processes in which components such as metallic parts are machined, ground etc., a coolant fluid is typically used. During such processes, droplets of coolant become atomized and may create a hazard. The hazard arises because an operator of the individual machine or any human being in the same enclosed building may be forced to breathe potentially very harmful materials.

In a number of currently available machining systems, centrifugal air pumps or blowers are used to move air with suspended liquid coolant therein. In such systems, one or more filters are placed in fluid connection with the outlet of the blower to remove liquid coolant from the air before pumping the air into the general building air. Filtration becomes much less efficient when large amounts of liquid are pumped into the filters. Moreover, the liquid-air mixture exiting the blower impacts the filters at high speed, resulting in re volatizing of the liquid (particularly, as the filters become saturated). The volatized liquid is pumped into the room in which the machine tool/system is operated, thereby creating a hazard for people in the surrounding area. As a result, current systems cannot meet proposed National Institute for Occupational Safety and Health (NIOSH proposed) air quality standards of 0.5 mg per cubic meter of factory air. See, What you Need to Know About Occupational Exposure to Metalworking Fluids, National Institute for Occupational Safety & Health, NIOSHP Publication 98-116 (March 1998).

SUMMARY

In one aspect, a system includes a processing system in which a liquid is used in processing such that at least a portion of the liquid becomes suspended in a gas and a liquid collection system in fluid connection with the processing system to decrease the amount of liquid in the suspension of the liquid in the gas. The liquid collection system includes a centrifugal pump (or blower) including a housing and a rotatable impeller within the housing. The housing also includes an inlet port and an outlet port in fluid connection therewith. The liquid collection system further includes a liquid collection device in fluid connection with the outlet port. The liquid collection device includes a gas outlet channel in fluid connection with the outlet port and a liquid outlet port spaced from the gas outlet channel and adjacent an inner surface of the housing of the centrifugal pump. The system may further include a container in fluid connection with the liquid outlet port to contain liquid (separated from the gas). In a number of embodiments, the liquid collection system includes a system housing at least partially enclosing the centrifugal pump and the liquid collection device. The system may, for example, be configured so that the liquid outlet port is positioned below the gas outlet channel. In a number of embodiments, the liquid is a coolant liquid.

In a number of embodiments, the system further includes at least one filter system in fluid connection with the gas outlet channel. The filter may, for example, include a first filter structure that is angled with respect to a direction of flow from the gas outlet channel to create a flow gradient on a surface of the first filter structure toward a bottom of the filter structure (that is, toward a collection area or volume, which may be in a downward direction and thus assisted by gravity). The first filter structure may, for example, be a baffle filter. The filter system may further include a second filter structure positioned after the first filter structure with respect to the direction of flow from the gas outlet channel. The second filter structure may be angled similarly to the first filter structure. The second filter structure may, for example, provide a tortuous flow path therethrough. The second filter structure may, for example, include a plurality of expanded metal members.

In a number of embodiments, the filter system further includes at least a third filter structure that is angled with respect to a direction of flow from the gas outlet channel to create a flow gradient on a surface of the third filter structure toward a bottom of the third filter structure. The third filter structure is positioned after the second filter structure with respect to the direction of flow from the gas outlet channel. The third filter structure may, for example, be a baffle filter. The filter system may, for example, further include a fourth filter structure positioned after the third filter structure with respect to the direction of flow from the gas outlet channel. The fourth filter structure may be angled similarly to the third filter structure. The fourth filter structure may, for example, provide a tortuous flow path therethrough. In a number of embodiments, the fourth filter structure includes a plurality of expanded metal members.

In a number of embodiments, the angle of the first filter structure is in the range of approximately 10 to 25 degrees with respect to a plane generally perpendicular to the direction of bulk flow from the gas outlet channel. In a number of embodiments, the angle of the first filter structure is in the range of approximately 14 to 25 degrees with respect to a plane generally perpendicular to the direction of bulk flow from the gas outlet channel. In embodiments with multiple filter structures, each of the filter structures may, for example, be angled in the range of approximately 10 to 25 degrees or 14 to 25 degrees with respect to a plane generally perpendicular to the direction of bulk flow from the gas outlet channel.

In another aspect, a system for decreasing the amount of a liquid in a suspension of a liquid in a gas includes a centrifugal pump including a housing, and a rotatable impeller within the housing. The housing includes an inlet port and an outlet port. The system further includes a liquid collection device in fluid connection with the outlet port. The liquid collection device includes a gas outlet channel in fluid connection with the outlet port and a liquid outlet port spaced from the gas outlet channel and adjacent an inner surface of the housing of the centrifugal pump.

In a further aspect, a method for decreasing the amount of a liquid in a suspension of a liquid in a gas includes drawing the suspension of the liquid in the gas through an inlet of a housing of a centrifugal pump by rotating an impeller of the centrifugal pump and placing a liquid collection device in fluid connection with an outlet port of the centrifugal pump. The liquid collection device includes a gas outlet channel in fluid connection with the outlet port and a liquid outlet port spaced from the gas outlet channel and adjacent an inner surface of the housing of the centrifugal pump.

In a further aspect, a liquid collection device for use in connection with an outlet port of a centrifugal pump (which includes a housing, an inlet port, and the outlet port) includes an inlet port adapted to be placed in fluid connection with the outlet port of the centrifugal pump. The liquid collection device includes a gas outlet channel in fluid connection with the inlet port thereof and a liquid outlet port spaced from the gas outlet channel and positioned to be adjacent an inner surface of the housing of the centrifugal pump when the liquid collection device is placed in fluid connection with the outlet port of the centrifugal pump.

In still a further aspect, a system for decreasing the amount of a liquid in a suspension of a liquid in a gas includes a gas outlet channel from which pressurized gas flows, a filter system including a first filter structure that is angled with respect to a direction of flow from the gas outlet channel to create a flow gradient on a surface of the first filter structure toward a bottom of the first filter structure. In a number of embodiment, the system further includes at least a second filter structure positioned after the first filter structure with respect to the direction of flow from the gas outlet channel. The second filter structure may be angled similarly to the first filter structure. The second filter structure may, for example, provide a tortuous flow path therethrough.

The devices, systems and method hereof organize liquid suspended or entrained in a gas in a way not previously done so that the liquid is coalesced and can be removed or separated from the gas as a liquid. The devices, systems and methods hereof readily meet the proposed NIOSH standards for air quality of 0.5 millimeters per cubic meter of fluid. Indeed, the proposed standard can be readily exceeded with a very low cost device, method or system hereof which can significantly improve health and safety conditions for operators of machine tools and other devices that create or cause atomized liquids.

The devices, systems, and methods hereof along with the attributes and attendant advantages thereof, will best be appreciated and understood in view of the following detailed description taken in conjunction with the accompanying drawings.

BRIEF DESCRIPTION OF THE DRAWINGS

FIG. 6 illustrates Table 1 including studies of various filter structure parameters.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "a filter structure" includes a plurality of such filter structures and equivalents thereof known to those skilled in the art, and so forth, and reference to "the filter structure" is a reference to one or more such filter structures and equivalents thereof known to those skilled in the art, and so forth.

In a number of embodiments hereof, systems or devices are designed to separate liquid droplets from a gas (for example, air). Such suspensions may, for example, be created in processing/machining enclosures in which a liquid lubricant or liquid coolant is used. The systems or devices hereof may, for example, be used to reduce or to minimize the exposure of machine operators and others in the vicinity of machines to potentially hazardous liquids used in the manufacturing process. The liquids may, for example, be either oil or water soluble oil (that is, aqueous or non-aqueous), or a mixture of water and oil soluble liquids.

Figure 1:
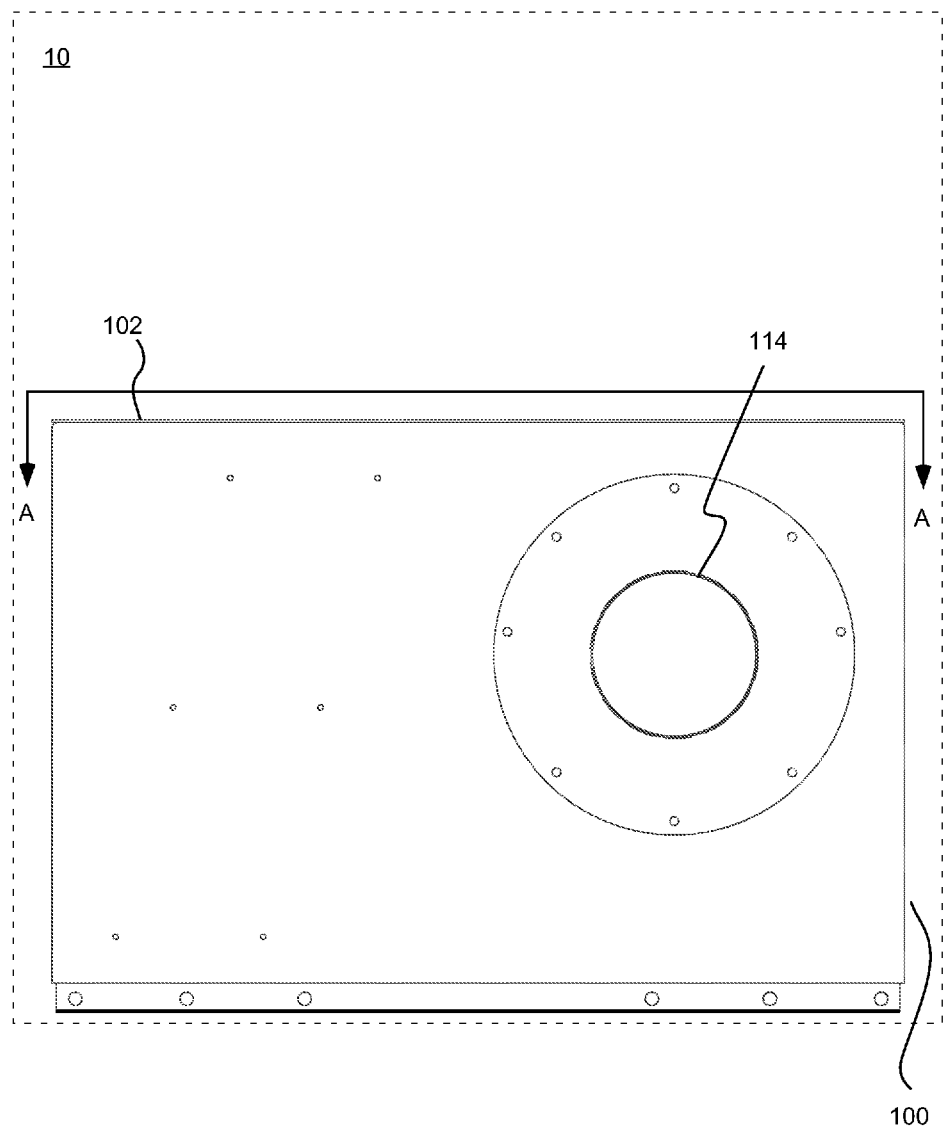
FIG. 1 illustrates a side view of an embodiment of a collection system in operative connection with a system such as a machining system wherein the machining system is illustrated in dashed lines.

FIG. 1 illustrates an embodiment of a liquid collection system or system 100 hereof in operative connection with a device or system 10 which results in the creation of a "mist" in which droplets of a liquid are suspended in a gas. In a number of representative embodiments, system 10 is a machining system in which a coolant liquid is used. In such systems, a mist including a coolant liquid suspended in air is created. However, system 10 may be used in connection with generally any system in which it is desirable to remove a liquid suspended in or entrained within a gas.

In the illustrated embodiment, system 100 includes a blower or centrifugal (gas) pump 110 (see, for example, FIG. 2) within a system housing 102. In a number of embodiments, a Dayton 4C108 blower/centrifugal pump available from W.W. Granger, Inc. of Lake forest, Ill. was used. Centrifugal pump 110 includes one or more rotatable impeller blades 112 within a pump housing 120 that draw the gas/air (in which liquid is suspended) into the center region of blade(s) 112 via an inlet 114 (see FIG. 1) as blade(s) 112 rotate. Rotation of blade(s) 112 of centrifugal pump 110 forces air drawn into housing 120 radially outward, toward an inside or interior wall surface of blower housing 120. As the air is forced at relatively high velocity radially outward, toward an interior surface 120a of housing 120, liquid droplets, which are heavier that the gas in which they are suspended, are forced radially outward to inner surface 120a of housing 120 by centrifugal force. The droplets come into contact with each other as the droplets travel along inner surface 120a of housing 120 and coalesce. The coalesced droplets of liquid are forced along inner surface 120a of housing 120 by relatively high centrifugal force created by blade(s) 112. For example, a 10-inch impeller turning at 3450 RPM has a surface speed of over 9,000 feet per minute. Liquids suspended in a gas are much denser than the gas in which they are suspended. Water, for example, is approximately 800 times denser than air. In centrifugal pump 110, liquid, including all sizes of droplets, are caused to travel along inner surface 120a of housing 120 via centrifugal force.

Figure 3A:
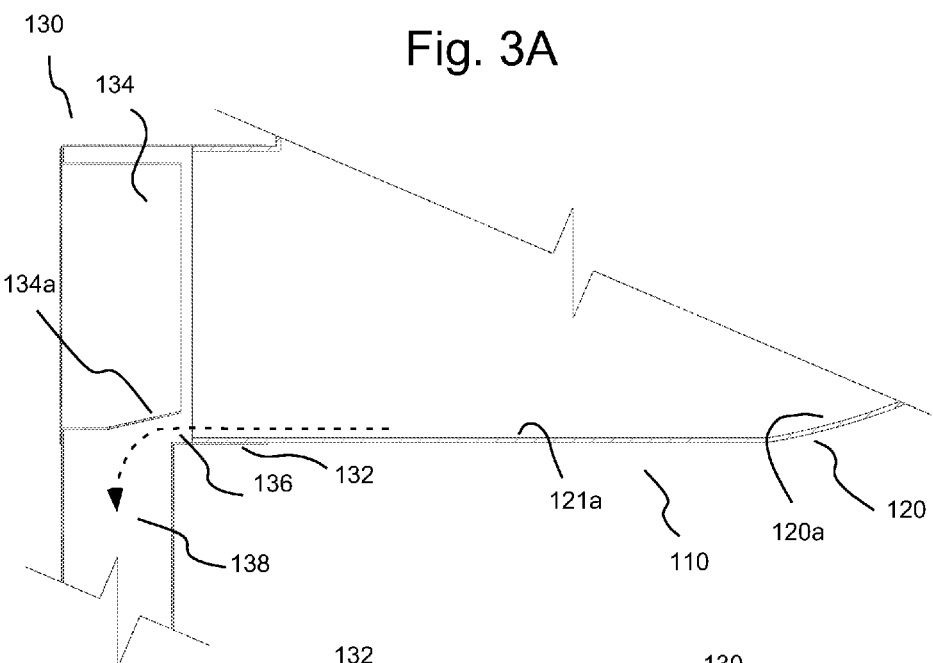
FIG. 3A illustrates and enlarged side, cross-sectional view of the encircled portion of FIG. 2.
Figure 3B:
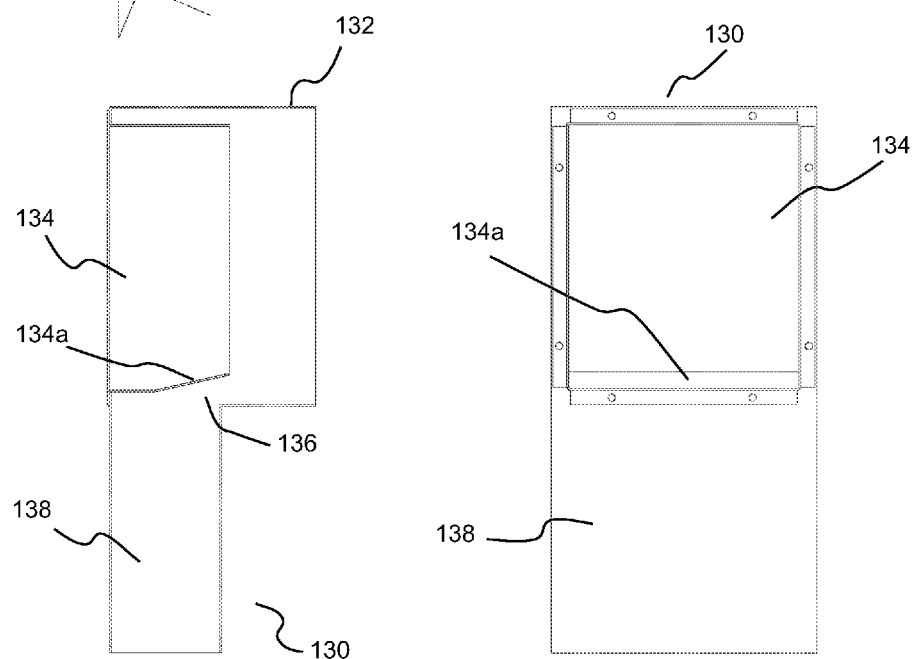
FIG. 3B illustrates an enlarged sided, cross-sectional view of a liquid collection device of the collection system of FIG. 1 wherein the liquid collection device is removed from connection with the centrifugal pump of the collection system.
Figure 3C:
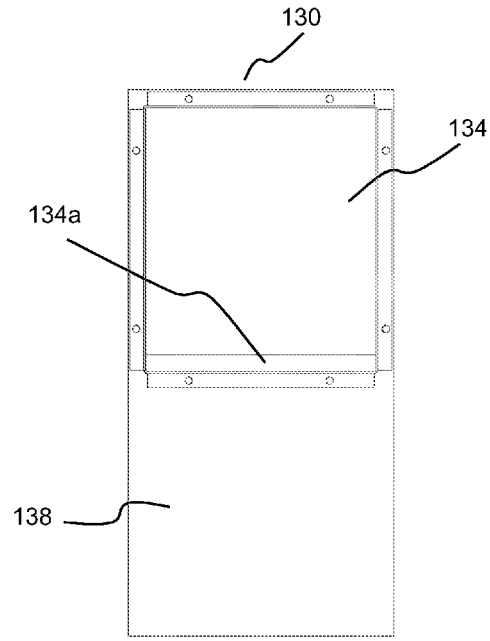
FIG. 3C illustrates an enlarged front view of the liquid collection device.

Centrifugal pump or blower 110 may, for example, be mounted or positioned so that a bottom flat surface 121a thereof is approximately or generally horizontal so that gravity assists in pulling liquid toward flat surface 121a (see, for example, FIG. 3A). Moreover, increased air pressure within housing 120 also assists in removing suspended liquid(s) from a gas such as air.

As described above, liquid is forced toward and coalesced along inside surface(s) 120a of housing 120 by the force generated by blade(s) 112, which may form a part of or be connected to a blade wheel 112a. The liquid flows across surface 121a and toward a liquid collection device 130 in fluid connection with an outlet port 126 of centrifugal pump 110. In the illustrated embodiment, liquid collector device 130 includes a connecting section 132 which forms a connection with outlet port 126 of housing 120. Connecting section 132 may, for example, be circular, square, rectangular etc. in cross-sectional shape and be dimensioned to have a perimeter slightly larger than a similarly shaped perimeter of outlet port 126 so that connecting section 132 passes around and forms a connection (for example, a sealed connection) with an outer wall of outlet port 126. A gas outlet channel 134 of liquid collection device 130 is in fluid connection with outlet port 126. In the illustrated embodiment, gas outlet channel 134 is dimensioned such that a space or gap 136 is formed between surface 121a of housing 120 through which liquid exiting outlet port 126 can pass. Gap 136 is formed or positioned to be aligned with that portion of outlet port 126 at which liquid is concentrated (as compared to the bulk flow through outlet port 126). See, for example, FIGS. 2 and 3A through 3C.

In that regard, because a significant portion of the liquid is not in the center of the gas/airstream, but on the bottom of flat surface 121a as describe above, a significant portion of the liquid is separated from the gas by liquid collector device 130 upon passing through gap 136. Gas outlet channel 134 may, for example, include a sloped section 134a on a bottom portion thereof to assist in assuring that liquid exiting outlet port 126 passes through gap 136 and into a liquid outlet channel 138 in fluid connection with gap 136. As, for example, illustrated in the dashed flow line/arrow of FIG. 3A, the liquid flows across inner wall 120a of housing 120, over lower surface 121a, and enters a pan or other container 140 (see FIG. 2), via liquid outlet channel 138.

The gas/air that exits gas outlet channel 134 is returned eventually to the atmosphere of the room is which system 10 is present. A significant majority of the liquid which had been suspended in the gas/air (for example, approximately 85%, 90% or more in a number of representative studies under high load), is removed prior to the gas/air exiting device 130 via gas outlet channel 134.

In system 100, after gas/air has passed through device 130, the gas/air flows through one or more filter systems. Unlike current systems, a significant portion (for example, 85%, 90% or more) of the liquid has been removed from the flow stream before the gas/air (which is travelling at relatively high velocity) impacts the first filter system. As compared to currently available systems, saturation of filter systems and revolatization of liquid is significantly reduced or eliminated.

Liquid collection device 130 is readily added to virtually any available centrifugal gas/air pump or blower via attachment of connecting section 132 to the outlet port of the centrifugal pump. Moreover, liquid collection device 130 may be formed integrally or monolithically with a centrifugal pump.

In the illustrated embodiment, the gas/air exiting liquid collection device 130 impacts one or more filter systems including, for example, one or more filter structures that are angled toward the gas/air exiting liquid collection device 130 with respect to a plane vertical to the direction of bulk flow exiting gas outlet channel 134. The direction of such bulk flow is represented by arrows in FIG. 2 and is, for example, generally horizontal in a number of embodiments. In the representative embodiment of FIG. 2, the direction of bulk flow is generally horizontal and the filter 160 (and each other filter structures) is angled by an angle a from the vertical direction (that is, the direction aligned with the gradient of gravity). In other words, the upper edge of filter 160 is drawn toward gas outlet channel 134, while the lower edge of filter 160 is moved away from gas outlet channel 134 as compared to a vertical position.

As the filter angles or inclines toward the gas source, the mechanical separation of the two fluids (that is, liquid and gas) becomes more efficient. The angle a of inclination causes liquid droplets to be affected by the force vector caused by the generally horizontal path of the droplet impacting the angled surface of the filter and enhances separation. Liquid droplets remaining in the flow exiting gas outlet channel 134 are forced at relatively high speeds towards the angled filter structure(s), forcing those remaining liquid droplets in the flow stream toward the bottom of system housing 102. As the filter angle a increases from 0 to 45 degrees, the force vector acting on the droplet becomes increasingly powerful. In experimental studies, a 45 degree angle caused problems in the case of higher flow rates at the bottom of the filter. In that regard, agitation of the liquid collecting at the bottom of the filter was observed, causing "splashing" with a standard baffle filter. Additionally, liquid reentering the gas/airflow may be reduced via one or more bottom guards 104, so that gas/air does not cause the liquid to rise back into the main gas/airstream. One or more top guards 104a may also be provided.

In general, an inclination angle of at least approximately 10 degrees is sufficient to observe a beneficial effect in separation. An inclination angle in the range of approximately 14 to 25 degrees allows efficient operation without damaging the ability of the filter to direct liquid down the filter surface without danger of reintroducing the liquid already collected at the bottom of the filter back into the cleaned air being exhausted from the device. In a number of studied embodiments, the filter structure(s) were angled at approximately 14 degrees.

Figure 2:
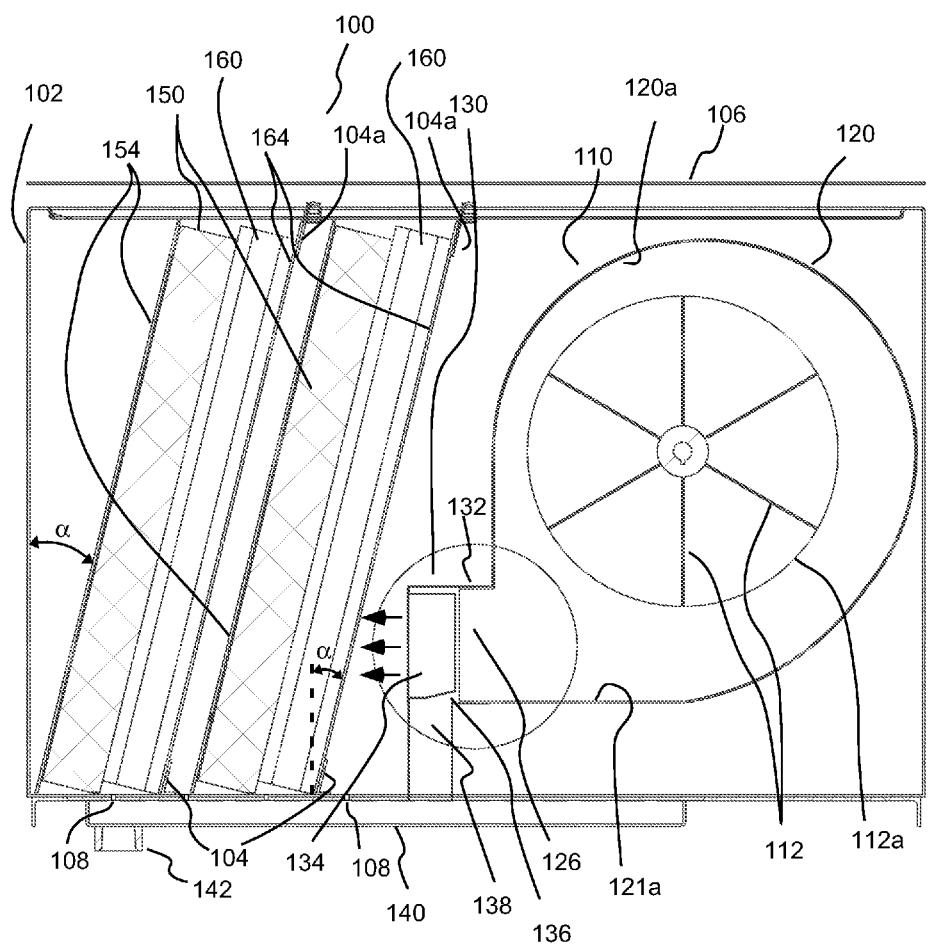
FIG. 2 illustrates a side, cross-sectional view of the collection system of FIG. 1.
Figure 4B:
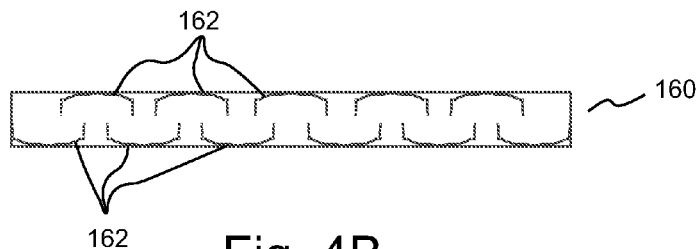
FIG. 4B illustrates a cross-sectional view of the first filter structure of FIG. 4A along line A"-A" of FIG. 4A.
Figure 4A:
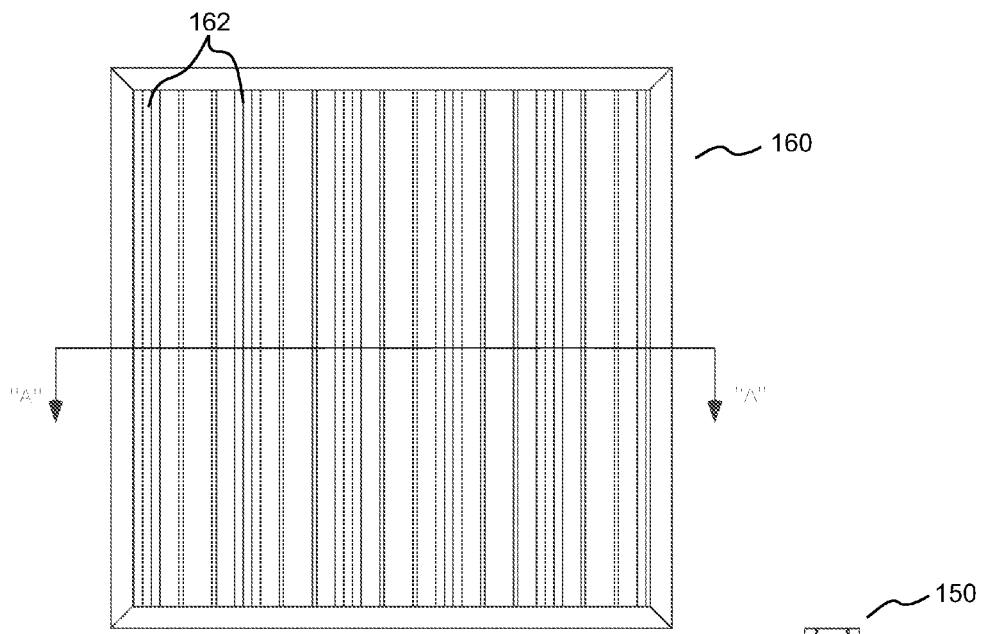
FIG. 4A illustrates a front view of an embodiment of a first filter structure (in the form of a baffle filter in the illustrated embodiment) for use in the system of FIG. 1.
Figure 4C:
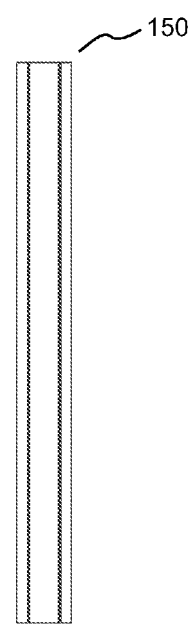
FIG. 4C illustrates a side view of the first filter structure of FIG. 4A.

In the embodiment illustrated in, for example, FIG. 2, two baffle filter structures or filters 160 are provided, which are supported at an inclination angle a with respect to the plane perpendicular to the bulk flow from gas outlet channel 134 via filter supports 164. Two expanded metal filter structures or filters 150 (each of which is positioned after one of baffle filters 160 with respect to the direction of the flowstream) are supported by filter supports 154 As illustrated in, for example, FIGS. 4A through 4C, baffle filters include a number of spaced baffle surfaces 162. Baffle surfaces 162 are extending surfaces which are contacted by the bulk gas flow exiting gas outlet channel 134. Upon impacting/contacting of the bulk flow with baffle surfaces 162, heavier substances (the liquid) in the flow collect on baffle surfaces 162. The separated liquid drains/flows downward. In the illustrated embodiment, baffle filters 160 include two rows of spaced baffle surface 162, which are staggered in position such that there is not a direct open path through baffle filters 160 for the bulk flow of gas/air exiting gas outlet channel 130. Baffle filters are, for example, used in the restaurant industry to prevent grease and flames from entering exhaust systems may be used or readily altered for use herein. In a number of embodiments, model FP-A20202N baffle filters and model LT20202N expanded metal filters (described below) available from Smith Filter Corporation of Moline, Ill. were used herein.

Figure 5A:
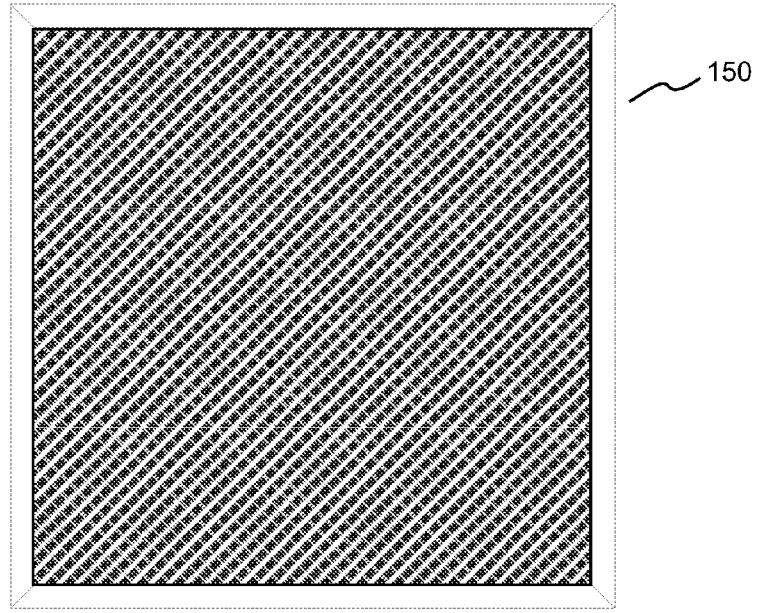
FIG. 5A illustrates an embodiment of a second filter structure (in the form of an expanded metal filter) for use in the system of FIG. 1.
Figure 5B:
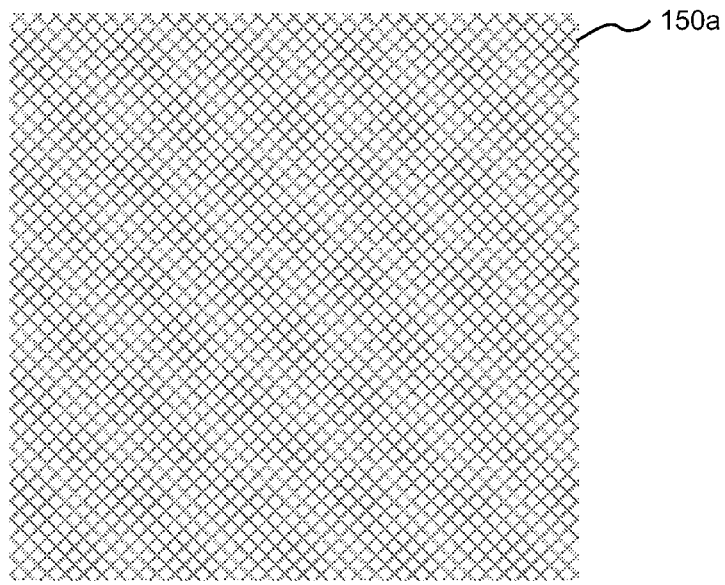
FIG. 5B illustrates a sheet of expanded metal for use in the second filter structure of FIG. 5A.

In a number of embodiments, a flow restricting filter which provides a tortuous path for gas to pass therethrough is placed after each baffle filter 160. In a number of such representative embodiments, one or more expanded metal filters 150 were placed after one or more baffle filters 160 in an alternating arrangement (see, FIG. 2). FIG. 5A illustrates a front view of an expanded metal filter. FIG. 5B illustrates a single "sheet" 150a of expanded metal. As known in the metal arts, expanded metal is a form of metal stock formed, for example, via shearing of a metal plate or sheet in a press. In that process, the metal stretches, leaving diamond-shaped voids surrounded by interlinked bars of the metal. In expanded metal filters 150 a plurality of such expanded metal sheets or members are stacked with each sheet or member being offset (in alignment) from the adjacent sheets or members to provide a tortuous path therethrough.

Without limitation to any mechanism, the presence of a flow restricting filter such as expanded metal filter 150 is believed to cause an increase in pressure at baffle surfaces 162, causing the flow to spread out along the surface/length of baffle surfaces 160 of baffle filter(s) 160, enhancing separation of the liquid from the gas bulk flow. Moreover, the tortuous gas flow path of through filters 150 prevents unobstructed flow of liquid containing gas therethrough.

Filter structures hereof may, for example, be dimensioned and connected within system housing 102 such that flow cannot pass around (and thus must pass through) the filter structures. Moreover, filter structures such as filter structures 150, which provide a tortuous flow path, may, for example, be placed in adjacent contact or in very close proximity to filter structures such as filter structures 160, which include extending surfaces for collecting liquid. The number and positions of the filter structures may be varied in different embodiments. For example, more or less than four filter structures may be used.

The type of filter structures of the filter system and their positions relative to each other may have an effect on the amount of liquid that is removed from the gas stream. FIG. 6 illustrates Table 1, which sets forth the results of a number of studies in which the type of filters used and the relative positions of the filters where changed. In each of the studies of FIG. 6, four filter structures were used in a system similar to system 100 forth in FIG. 2 (other than the type and position of the filter structures in a number of the studies). The liquid in the studies was oil having a viscosity of 346 sus (Saybolt Universal Seconds) and a density of 0.834 g/ml. The temperature of the studies was 19° C. In Table 1, the order of the filters is set forth in the order that they are contacted by the flow from gas outlet channel 134 (that is, from left to right in the orientation of FIG. 2). In all of the experiments each of the four filters was angled at approximately 14 degrees as set forth above.

In study 1, unpressurized oil was introduced into the device inlet via the suction created by the centrifugal pump. The types of filter and their relative positions was identical to that set forth in FIG. 2. In that regard, the flow from gas flow outlet 134 first contacts a first filter (a baffle filter), then contacts a second filter (an expanded metal or mesh filter), then contact a third filter (a baffle filter), and then contacts a fourth filter (an expanded metal or mesh filter). The accuracy limitation of the mass scale used to measure oil escaping the system was 1 gram. In study 1, 2000 grams of oil were introduced to the system, while the oil that escaped the devices was less than 1 gram. Setting the escaped oil at 1 gram, only 0.04% of the oil escaped the test system.

In studies 2 through 5, a paint gun was used to introduce atomized oil to the system under pressure. The tests of studies 2 through 5 were designed to be more extreme than any real-world application. A paint gun designed to operate at approximately 2 bar was supplied with 8 bar of pressure to maximize the amount of fluid atomization, thereby increasing the difficulty of the test. This higher pressure created an unrestricted plume of mist that was approximately 3 meters long. The nozzle of the paint gun was clamped in place 0.28 m from the inlet of the system and centered on that inlet.

In study 2, the flow from gas flow outlet 134 first contacts a first filter (a mesh or expanded metal filter), then contacts a second filter (an baffle filter), then contact a third filter (an expanded metal or mesh filter), and then contacts a fourth filter (a baffle filter). This order is the reverse of that shown in FIG. 2. In study 3, only baffle filters were used. In study 4, only mesh or expanded metal filters were used. In study 5, the flow from gas flow outlet 134 first contacts a first filter (a baffle filter), then contacts a second filter (an expanded metal or mesh filter), then contact a third filter (a baffle filter), and then contacts a fourth filter (an expanded metal or mesh filter). The filter order of study 5 is thus the same as study 1 and is the order illustrated in FIG. 2. In all studies, a significant percentage of the oil is removed from the air. Without limitation to any mechanism, it is believed that the significant amount of the suspended liquid removed via liquid collection device 130 allows more efficient operation of all filter media as compared to previously available systems. Moreover, the angling of the filter media with respect to the bulk flow of gas enhances that efficiency. Of the studied systems, system 100 of FIG. 2 (studies 1 and 5) provided the best results, with only 0.55% of oil escaping even under the extreme test conditions of study 5 of Table 1 (FIG. 6).

In the illustrated embodiment, a gas/air outlet (not shown) was positioned at the top of system 100 in a top cover 106 so that the gas/air exiting system 100 rises away from collected liquid at the bottom of system 100. The liquid that is collected from device 130 flows downward under pressure via the air that is pumped into pan 140. Holes 108 may also be provided in the bottom system housing 102 to allow the relatively small amounts of liquid that collect thereon to also be forced down into pan 140. Liquid exits pan 140 through a pan outlet or drain 142.

The foregoing description and accompanying drawings set forth embodiments at the present time. Various modifications, additions and alternative designs will, of course, become apparent to those skilled in the art in light of the foregoing teachings without departing from the scope hereof. The scope of the invention is indicated by the following claims rather than by the foregoing description. All changes and variations that fall within the meaning and range of equivalency of the claims are to be embraced within their scope.

What is claimed is:

1. A system, comprising:
an industrial processing system in which a liquid used in the processing system becomes entrained in air; and
a liquid collection system in fluid connection with the processing system to decrease the amount of liquid in the air; the liquid collection system comprising:
a centrifugal pump comprising a housing, and a rotatable impeller within the housing, the housing comprising an inlet port and an outlet port, the centrifugal pump being adapted to pressurize a flowstream comprising the air and the entrained liquid; and
a liquid collection device attached to the outlet port, the liquid collection device comprising a gas outlet channel in fluid connection with the outlet port, a liquid outlet port spaced from the gas outlet channel and adjacent an inner surface of the housing of the centrifugal pump, a liquid outlet channel in fluid connection with the liquid outlet port, the liquid outlet port separating a portion the flowstream flowing adjacent the inner surface of the housing and exiting the outlet port from the reminder of the flowstream which exits the liquid collection device via the gas outlet channel, and a container in fluid connection with the liquid outlet channel adapted to receive the portion of the flowstream exiting the liquid collection device via the liquid outlet channel.

2. The system of claim 1 wherein the gas outlet channel is in general alignment with the outlet port.

3. The system of claim 1 further comprising at least one filter system in fluid connection with the gas outlet channel, the filter system being positioned so that flow from the gas outlet channel impinges upon the filter system.

4. The system of claim 3 wherein the filter system comprises a first filter structure that is angled with respect to a direction of flow from the gas outlet channel to create a flow gradient on a surface of the first filter structure toward a bottom of the filter structure.

5. The system of claim 4 wherein the first filter structure is a baffle filter.

6. The system of claim 5 wherein the filter system further comprises a second filter structure positioned after the first filter structure with respect to the direction of flow from the gas outlet channel, the second filter structure being angled similarly to the first filter structure, the second filter structure providing a tortuous flow path therethrough.

7. The system of claim 6 wherein the second filter structure comprises a plurality of expanded metal members.

8. The system of claim 6 wherein the filter system further comprises at least a third filter structure that is angled with respect to a direction of flow from the gas outlet channel to create a flow gradient on a surface of the third filter structure toward a bottom of the third filter structure, the third filter structure being positioned after the second filter structure with respect to the direction of flow from the gas outlet channel.

9. The system of claim 8 wherein the third filter structure is a baffle filter.

10. The system of claim 9 wherein the filter system further comprises at least a fourth filter structure positioned after the third filter structure with respect to the direction of flow from the gas outlet channel, the fourth filter structure being angled similarly to the third filter structure, the fourth filter structure providing a tortuous flow path therethrough.

11. The system of claim 10 wherein the fourth filter structure comprises a plurality of expanded metal members.

12. The system of claim 5 wherein the angle of the first filter structure is in the range of approximately 10 to 25 degrees with respect to a plane perpendicular to the direction of flow from the gas outlet channel.

13. The system of claim 5 wherein the angle of the first filter structure is in the range of approximately 14 to 25 degrees with respect to a plane perpendicular to the direction of flow from the gas outlet channel.

14. The system of claim 10 wherein the angle of each of the first filter structure, the second filter structure, the third filter structure and the fourth filter structure is in the range of approximately 10 to 25 degrees with respect to a plane perpendicular to the direction of flow from the gas outlet channel.

15. The system of claim 10 wherein the angle of each of the first filter structure, the second filter structure, the third filter structure and the fourth filter structure is in the range of approximately 14 to 25 degrees with respect to a plane perpendicular to the direction of flow from the gas outlet channel.

16. The system of claim 1 wherein the liquid collection system comprises a system housing at least partially enclosing the centrifugal pump and the liquid collection device.

17. The system of claim 1 wherein the liquid outlet port is positioned outside the gas outlet channel with respect to the center of the flowstream exiting the outlet port.

18. The system of claim 1 wherein the liquid comprises at least one of a coolant liquid or a lubricant.

19. A system for decreasing the amount of a liquid entrained in a gas, comprising:
a centrifugal pump comprising a housing, and a rotatable impeller within the housing, the housing comprising an inlet port and an outlet port, the centrifugal pump being adapted to pressurize a flowstream comprising the air and the entrained liquid; and
a liquid collection device in fluid connection with the outlet port, the liquid collection device comprising a gas outlet channel in fluid connection with the outlet port, a liquid outlet port spaced from the gas outlet channel and adjacent an inner surface of the housing of the centrifugal pump, a liquid outlet channel in fluid connection with the liquid outlet port, the liquid outlet port being adapted to separate a portion the flowstream flowing adjacent the inner surface of the housing and exiting the outlet port from the reminder of the flowstream which exits the liquid collection device via the gas outlet channel, and a container in fluid connection with the liquid outlet channel adapted to receive the portion of the flowstream exiting the liquid collection device via the liquid outlet channel.

20. A method for decreasing the amount of a liquid entrained in a gas, comprising:
drawing a flowstream of the liquid entrained in the gas through an inlet of a housing of a centrifugal pump by rotating an impeller of the centrifugal pump; and
passing the flowstream exiting an outlet of the housing to a liquid collection device in fluid connection with the outlet port of the centrifugal pump, the liquid collection device comprising a gas outlet channel in fluid connection with the outlet port, a liquid outlet port spaced from the gas outlet channel and adjacent an inner surface of the housing of the centrifugal pump, a liquid outlet channel in fluid connection with the liquid outlet port, the liquid outlet port being adapted to separate a portion the flowstream flowing adjacent the inner surface of the housing and exiting the outlet port from the reminder of the flowstream which exits the liquid collection device via the gas outlet channel, and a container in fluid connection with the liquid outlet channel adapted to receive the portion of the flowstream exiting the liquid collection device via the liquid outlet channel.

21. A liquid collection device for use in connection with an outlet port of a centrifugal pump including a housing, an inlet port, and the outlet port, the liquid collection device comprising: an inlet port, a connector adapted to form a connection with the housing of the centrifugal pump to place the inlet port in fluid connection with the outlet port of the centrifugal pump, a gas outlet channel in fluid connection with the inlet port of the liquid collection device, a liquid outlet port spaced from the gas outlet channel and positioned to be adjacent an inner surface of the housing of the centrifugal pump when the liquid collection device is placed in fluid connection with the outlet port of the centrifugal pump, a liquid outlet channel in fluid connection with the liquid outlet port, the liquid outlet port being adapted to separate a portion a flowstream exiting the outlet port that is flowing adjacent the inner surface of the housing and exiting the outlet port from the reminder of the flowstream which exits the liquid collection device via the gas outlet channel, and a container in fluid connection with the liquid outlet channel adapted to receive the portion of the flowstream exiting the liquid collection device via the liquid outlet channel.

22. A system for decreasing the amount of a liquid in a suspension of a liquid in a gas exiting a machine tool, comprising:
a housing having an inlet port for connection to the machine tool;
a centrifugal pump within the housing and comprising a gas outlet channel from which pressurized gas flows;
a filter system within the housing positioned so that flow from the gas outlet channel impinges upon the filter system, the filter system comprising comprises a first filter structure that is angled with respect to a direction of flow from the gas outlet channel to create a flow gradient on a surface of the first filter structure toward a bottom of the filter structure; and
a second filter structure positioned after the first filter structure with respect to the direction of flow from the gas outlet channel, the second filter structure being angled similarly to the first filter structure, the second filter structure providing a tortuous flow path therethrough; the housing further comprising a liquid outlet positioned vertically below the first filter structure and the second filter structure and a gas outlet positioned vertically above the first filter structure and the second filter structure.

* * * * *